UNITED STATES PATENT OFFICE.

ARTHUR ZITSCHER, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

PROCESS OF MAKING THE ARYLAMIDS OF 2.3-OXYNAPHTHOIC ACID.

1,101,111.     Specification of Letters Patent.     Patented June 23, 1914.

No Drawing.     Application filed November 14, 1913. Serial No. 800,951.

*To all whom it may concern:*

Be it known that I, ARTHUR ZITSCHER, doctor of philosophy, chemist, citizen of the German Empire, and resident of Offenbach-on-the-Main, in the Grand Duchy of Hesse, Germany, with the post-office address Freidrichstrasse 31, have invented new and useful Improvements in the Process of Making the Arylamids of 2.3-Oxynaphthoic Acid, of which the following is a specification.

My invention relates to a process of making arylamids of 2:3-oxynaphthoic acid consisting in heating 2:3-oxynaphthoic acid and an arylamin with a dehydrating agent in an indifferent diluent. As dehydrating agents can be employed for instance phosphorus trichlorid, phosphorus-oxychlorid or thionylchlorid.

By condensing the arylamins with 2:3-oxynaphthoic acid according to the process described by Schöpff in the "*Berichte der Deutschen Chemischen Gesellschaft*" 25 page 2740, besides the arylamids of 2:3-oxynaphthoic acid there is obtained always an arylamid of arylamino-3-naphthoic acid in more or less large quantity; moreover by condensing 2:3-oxynaphthoic acid with the dichloro-anilins or diamins resinous, very darkly colored by-products are formed, and by condensing the said acid with naphthylamins dinaphtylamins are also obtained in a considerable quantity (see Strohbach, *Berichte der Deutschen Chemischen Gesellschaft* 34, page 4152). These by-products must be removed by a troublesome purification to bring the product into a form adapted for the production of dyestuffs. For that reason the yield of pure product is but small. Compared with this process the present invention is very advantageous owing to its excellent yield and the purity of the arylamids of 2:3-oxynaphthoic acid obtained.

According to the present process it is easy to condense 2:3-oxynaphthoic acid with anilin itself, its homologues and chloro-substitution products, with anisidins, chlorotoluidins and chloro-anisidins, with aminophenols, with diamino-bases, for example with para-phenylenediamin, meta-phenylene-diamin and the bases belonging to the diphenyl series such as benzidin and tolidin and also with naphtylamins and so on. All these arylamids of 2:3-oxynaphthoic acid are important intermediate products for the production of azo-dyestuffs.

The following examples illustrate the invention, the parts being by weight:

Example I: 188 parts of 2:3-oxynaphthoic acid are suspended in toluene, 93 parts of anilin are added while stirring and 60 parts of phosphorus trichlorid are dropped into the mixture. The mass is now boiled under the reflux condenser, while continuously stirring, until no free amin can be detected, then sodium carbonate is added until the reaction is alkaline, and the toluene is expelled by steam. The residue is filtered, well washed and dried. The anilid of 2:3-oxynaphthoic acid, thus obtained, forms a colorless powder directly melting at 243–244°.

Example II: 188 parts of finely ground 2:3-oxynaphthoic acid and 140 parts of finely ground 2-naphthylamin are suspended in xylene, and at 60–70° 70 parts of phosphorus trichlorid are dropped in. The mixture is heated to 110–120°, while well stirring, until the reaction is complete. After working up, as described above, the 2-naphthalid of 2:3-oxynaphthoic acid is obtained as an almost colorless powder melting at 241–242°, when crystallized from chlorobenzene, the compound forms lustrous needles melting at 243–244°.

Example III: A mixture of 188 parts of 2:3-oxynaphthoic acid and 154 arts of 2:5 dichloroanilin in xylene is mixed with 150 parts of thionyl chlorid and the mixture is heated while stirring at 110–120° until the reaction is complete. Then the mixture is mixed with sodium carbonate until the reaction is alkaline, the xylene is expelled by steam, the residue is filtered while hot, well washed and dried. The 2:5-dichloroanilid of 2:3-oxynaphthoic acid, thus obtained, forms, when crystallized from alcohol, slender lustrous needles melting at 246–247°.

Example IV: Into a suspension of 188 parts of 2:3-oxynaphthoic acid and 55 parts of 2:4-toluylenediamin in toluene, heated to 70°, 70 parts of phosphorus-trichlorid are slowly dropped. The mixture is boiled in a reflux apparatus until the reaction is complete. Then the mixture is mixed with sodium carbonate until the reaction is alkaline, and the toluene is expelled by steam. The residue is filtered, while hot, well washed and dried. The condensation product, thus obtained, of the formula:

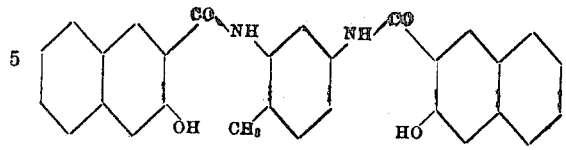

forms a colorless powder. Crystallized from acetic acid, it forms slender rods melting at 261–262°.

In analogous manner the diamins belonging to the diphenyl series can be condensed with two or also only with one molecular proportion of 2:3-oxynaphthoic acid.

In the following table the properties of some of the arylamids obtainable according to the present process are described:

| Arylamids of 2:3-oxynaphthoic acid. | Crystallized from— | Melting point. C. | Aspect. | Color of the solution in diluted caustic soda lye. |
|---|---|---|---|---|
| Anilid (Example I) | Chlorobenzene | 243–244 | Lanceolated leaflets | Yellow. |
| Ortho-anisidid | Alcohol | 167–168 | Colorless matted needles | Yellow. |
| Ortho-chloro-anilid | Alcohol | 225–226 | Colorless needles | Yellow. |
| Para-chloro-anilid | Ortho-dichlorobenzene | 258–259 | Colorless leaflets | Yellow. |
| Meta-chloro-anilid | Chlorobenzene | 241–242 | Almost colorless crystalline powder | Yellow. |
| 2.5-dichloro-anilid (Example III) | Alcohol | 246–247 | Fine lustrous needles | Yellow. |
| Ortho-toluidid | Solvent naphtha | 195–196 | Colorless leaflets | Yellow. |
| Para-toluidid | Solvent naphtha | 221–222 | Colorless needles | Yellow. |
| α-naphthalid | Xylene | 222–223 | Almost colorless crystalline powder | Yellow. |
| β-naphthalid (Example II) | Chlorobenzene | 243–244 | Lustrous needles | Yellow. |
| Compound with 2:4-toluylenediamin (Example IV) | Acetic acid | 261–262 | Slender needles | Yellow. |
| N-ethylanilid | Ethyl acetate | 153–154 | Rhombic tables | Yellow. |
| Ortho-oxy-anilid | Solvent naphtha | ¹214–215 | Colorless crystalline powder | Yellow. |

¹ With decomposition.

Now what I claim and desire to secure by Letters Patent is the following:

The process of making arylamids of 2:3-oxynaphthoic acid consisting in heating 2:3-oxynaphthoic acid and an arylamin with a dehydrating agent in an indifferent diluent.

In testimony, that I claim the foregoing as my invention, I have signed my name in presence of two witnesses, this thirtieth day of October 1913.

ARTHUR ZITSCHER.

Witnesses:
PETER LAUTENSCHLÄGER,
RUDOLF KIMPEL.